United States Patent
Matsumoto et al.

[11] Patent Number: 5,864,447
[45] Date of Patent: *Jan. 26, 1999

[54] DISK DRIVE WITH STOPPER MECHANISM INCLUDING A CUSHION MEMBER SEATED ON A CIRCUMFERENTIAL GROOVE

[75] Inventors: Takashi Matsumoto; Norio Yagi, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 641,884

[22] Filed: May 2, 1996

[30] Foreign Application Priority Data

Aug. 15, 1995 [JP] Japan .................................. 7-208247

[51] Int. Cl.$^6$ ........................................................ G11B 5/54
[52] U.S. Cl. ................................................................. 360/105
[58] Field of Search ................................... 360/105–106, 360/97.01

[56] References Cited

U.S. PATENT DOCUMENTS

| | | | |
|---|---|---|---|
| 5,109,310 | 4/1992 | Ohkjita et al. | 360/106 |
| 5,313,354 | 5/1994 | Sampietro et al. | 360/105 |
| 5,365,389 | 11/1994 | Jobbari et al. | 360/105 |
| 5,402,290 | 3/1995 | Daniel | 360/106 |
| 5,455,726 | 10/1995 | Liu | 360/106 |
| 5,459,359 | 10/1995 | Umehara | 360/105 |
| 5,600,516 | 2/1997 | Phillips et al. | 360/105 |

FOREIGN PATENT DOCUMENTS

62-142772 9/1987 Japan .
41-115366 10/1992 Japan .

*Primary Examiner*—Brian E. Miller
*Attorney, Agent, or Firm*—Greer, Burns, & Crain, Ltd.

[57] ABSTRACT

Disclosed herein is a magnetic disk drive including a head actuator for moving a head across tracks of a magnetic disk. The head actuator includes an actuator arm rotatably mounted in a housing, for supporting at its tip the head. The magnetic disk drive further includes an inner stopper adapted to come into contact with the actuator arm, for stopping excess movement of the actuator arm toward an inner circumferential portion of the disk, and an outer stopper adapted to come into contact with the actuator arm, for stopping excess movement of the actuator arm toward an outer circumferential portion of the disk. The inner stopper is the same in structure as the outer stopper. Each of the inner stopper and the outer stopper includes a shaft fixed to a base of the housing and having an outer circumferential surface formed with an annular groove, and a cylindrical rubber cushion mounted on the outer circumferential surface of the shaft so as to cover the annular groove.

21 Claims, 6 Drawing Sheets

DISK DRIVE WITH STOPPER MECHANISM INCLUDING A CUSHION MEMBER SEATED ON A CIRCUMFERENTIAL GROOVE

BACKGROUND OF THE INVENTION

1. Field of the Invention

The present invention relates generally to a magnetic disk drive, and more particularly to a stopper mechanism for restricting the range of rotational movement of a head actuator in the magnetic disk drive.

2. Description of the Related Art

In a magnetic disk drive, a magnetic head is mounted at the tip of a head actuator to read/write data on a data zone of a magnetic disk rotating at high speeds. An actuator stopper is provided in the magnetic disk drive to restrict the range of rotational movement of a rotary head actuator. In the event that the head actuator runs away for any one of a number reasons, the actuator stopper serves to prevent the magnetic head mounted at the tip of the head actuator from being deflected from the magnetic disk. The actuator stopper serves also to define a start position of servo track writing.

In a conventional actuator stopper mechanism in a magnetic disk drive, an inner stopper and an outer stopper are bonded to or press-fitted with a magnetic circuit fixed to a base of the magnetic disk drive, and a coil supporting portion of a head actuator is formed so as to come into contact with either the inner stopper or the outer stopper, thereby restricting the range of rotational movement of the head actuator.

In general, each of the inner stopper and the outer stopper includes a shaft and a cylindrical rubber cushion mounted on the shaft. The cylindrical rubber cushion functions to reduce the impact acceleration of the head actuator upon collision of the head actuator against the inner stopper or the outer stopper in case of running-away of the head actuator, thereby preventing damage to the disk from the head mounted on the head actuator striking against the disk.

In the case that the head actuator runs away, the impact acceleration in a seek direction of the head actuator is large. Accordingly, the rubber cushion in the conventional stopper mechanism has a low rubber hardness to suppress the impact acceleration. In general, however, the rubber cushion having a low rubber hardness is higher in cost than a rubber cushion having a high rubber hardness.

Another know type of actuator stopper mechanism is one having a structure in which a rubber cushion like an O-ring is press-fitted with a shaft. In this structure, a striking position of the head actuator on the O-ring may slip because of by variations in the vertical tolerance of the head actuator, causing variations in the start position of servo track writing. Further, a possible slip in of position of the O-ring causes an increase in vertical acceleration of the head actuator when it runs away. Additionally, the use of such an O-ring shaped rubber cushion requires a complicated mold, causing an increase in cost of the mold.

SUMMARY OF THE INVENTION

It is therefore an object of the present invention to provide an inexpensive actuator stopper mechanism which can effectively suppress the impact acceleration of the actuator with no variations in the start position of servo track writing.

In accordance with an aspect of the present invention, there is provided a disk drive comprising a housing having a base; a disk rotatably mounted in the housing and having a plurality of tracks; a head for reading/writing data on the disk; a head actuator rotatably mounted in the housing and having an actuator arm for supporting at its tip the head, for moving the head across the tracks of the disk; an inner stopper adapted to come into contact with the actuator arm, for stopping excess movement of the actuator arm toward an inner circumferential portion of the disk; and an outer stopper adapted to come into contact with the actuator arm, for stopping excess movement of the actuator arm toward an outer circumferential portion of the disk; wherein the inner stopper comprises a first shaft fixed to the base and having an outer circumferential surface formed with a first annular groove, and a first cylindrical cushion member mounted on the outer circumferential surface of the first shaft so as to cover the first annular groove; and the outer stopper comprises a second shaft fixed to the base and having an outer circumferential surface formed with a second annular groove, and a second cylindrical cushion member mounted on the outer circumferential surface of the second shaft so as to cover the second annular groove.

Each of the inner stopper and the outer stopper has the same structure such that the cylindrical cushion member is mounted on the outer circumferential surface of the shaft so as to cover the annular groove formed on the outer circumferential surface of the shaft. Accordingly, even when the cylindrical cushion member has a high hardness, it can be flexed enough so as to enter the annular groove, thereby adequately suppressing the impact acceleration of the head actuator. Furthermore, since the cylindrical cushion member having a high hardness is relatively inexpensive, a cost reduction of the stopper mechanism can be realized.

In accordance with another aspect of the present invention, there is provided a disk drive comprising a housing having a base; a disk rotatably mounted in the housing and having a plurality of tracks; a head for reading/writing data on the disk; a head actuator rotatably mounted in the housing and having an actuator arm for supporting at its tip the head, for moving the head across the tracks of the disk; an inner stopper adapted to come into contact with the actuator arm, for stopping excess movement of the actuator arm toward an inner circumferential portion of the disk; and an outer stopper adapted to come into contact with the actuator arm, for stopping excess movement of the actuator arm toward an outer circumferential portion of the disk; wherein the inner stopper comprises a first shaft fixed to the base and having an outer circumferential surface formed with a first annular groove, the first annular groove having a bottom surface formed with a second annular groove, and a first cylindrical cushion member mounted in the first annular groove so as to cover the second annular groove; and the outer stopper comprises a second shaft fixed to the base and having an outer circumferential surface formed with a third annular groove, the third annular groove having a bottom surface formed with a fourth annular groove, and a second cylindrical cushion member mounted in the third annular groove so as to cover the fourth annular groove.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
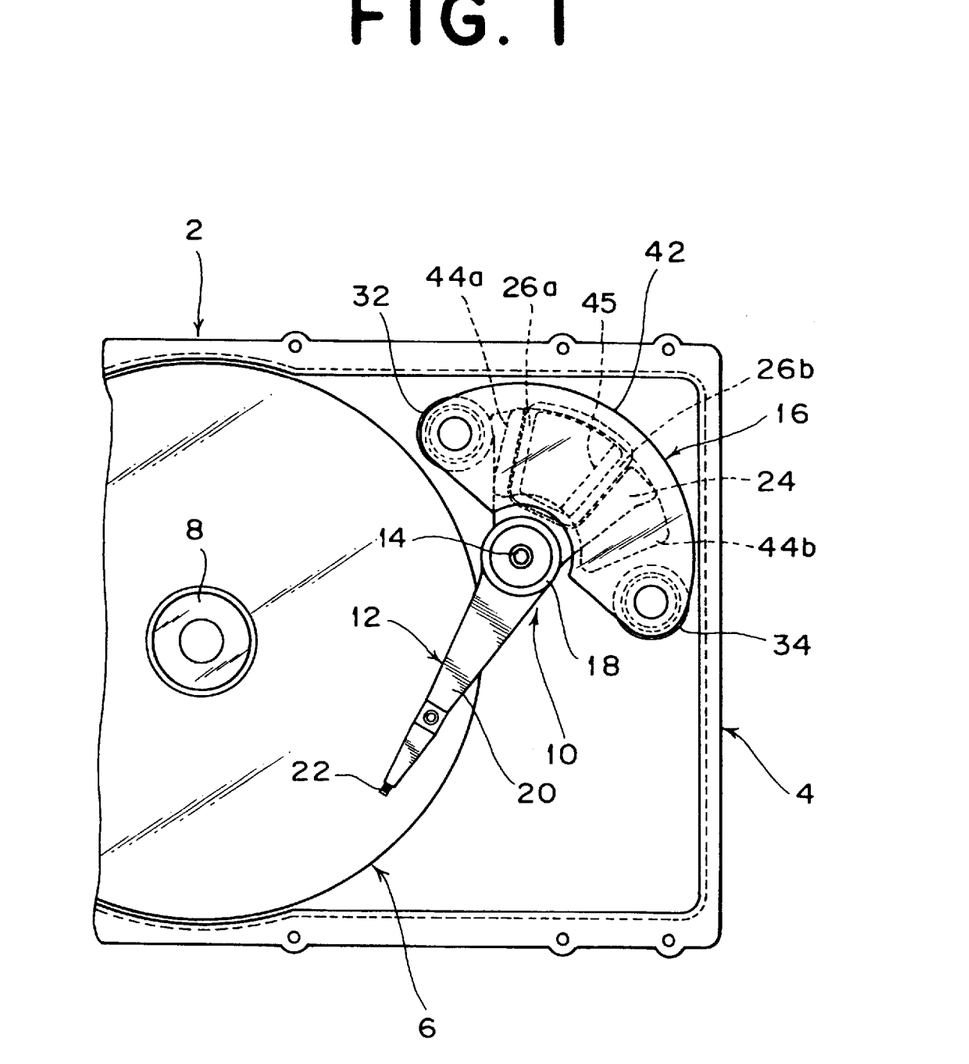
FIG. 1 is a partially cutaway, plan view of a magnetic disk drive according to the present invention in the condition where a cover of the disk drive is removed.

Referring to FIG. 1, there is shown a partially cutaway, plan view of a magnetic disk drive including the actuator stopper mechanism according to the present invention. Reference numeral 2 denotes a housing (disk enclosure) consisting of a base 4 and a cover (not shown). The housing 2 contains a magnetic disk 6 to be rotationally driven by a spindle motor assembly 8.

Figure 2:
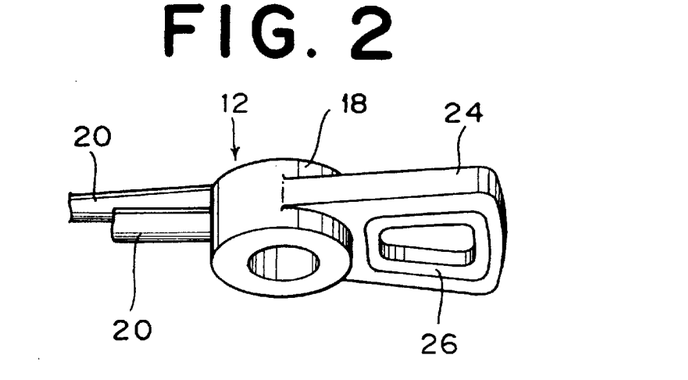
FIG. 2 is a partially cutaway, perspective view of an actuator arm assembly in the disk drive.

Reference numeral 10 denotes a rotary actuator consisting of an actuator arm assembly 12 and a magnetic circuit 16. The actuator arm assembly 12 is rotatably mounted on a shaft 14 fixed to the base 4. As best shown in FIG. 2, the actuator arm assembly 12 has an actuator block 18 fixed through a bearing (not shown) to the shaft 14, two arms 20 extending from the actuator block 18 in one direction, and a coil supporting member 24 extending from the actuator block 18 in another direction opposite to the direction of extension of the arms 20. A magnetic head 22 for reading/writing data on the magnetic disk 6 is mounted at the tip of each arm 20. A moving coil 26 is mounted on the coil supporting member 24.

Figure 3:
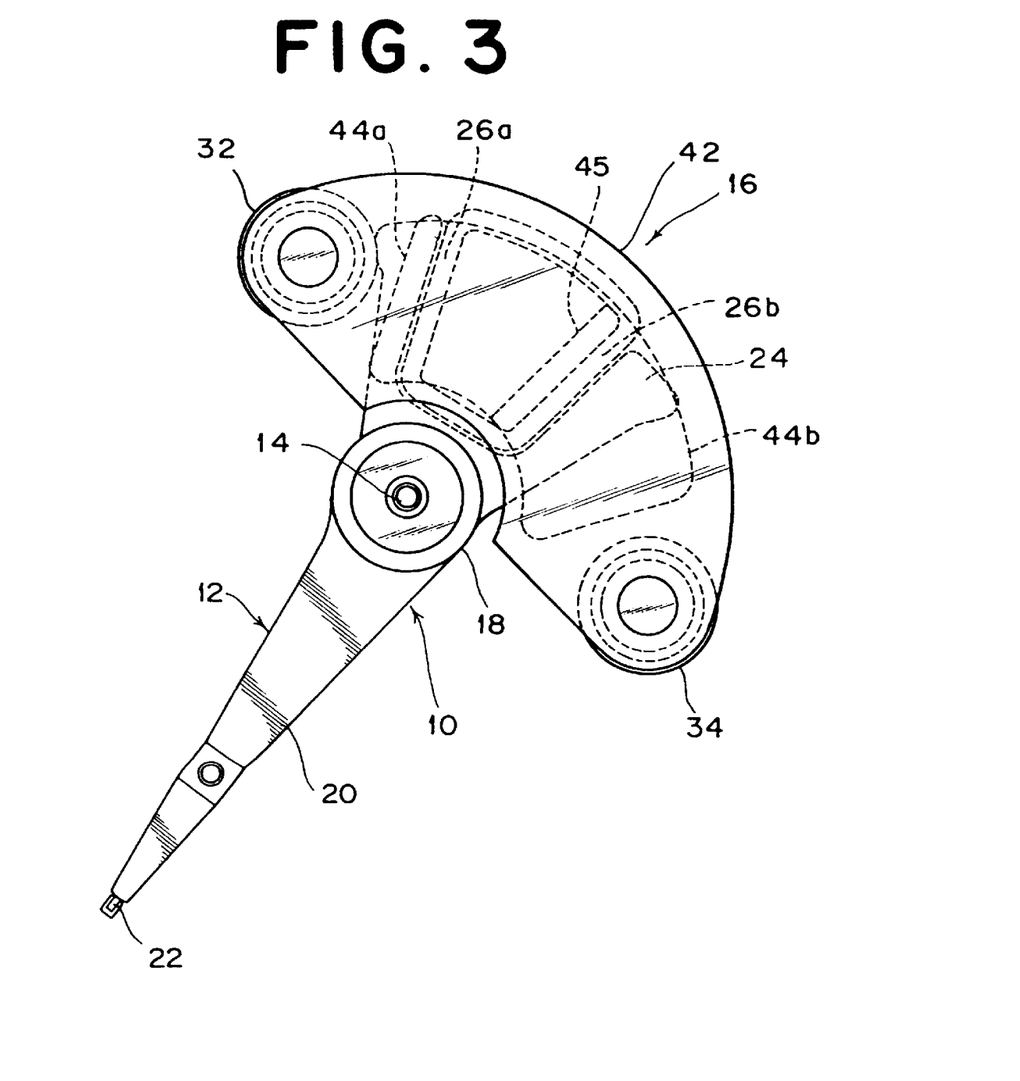
FIG. 3 is an enlarged plan view of a rotary actuator in the disk drive.

As shown in FIGS. 1 and 3, the moving coil 26 has first and second effective portions 26a and 26b perpendicular to the axis of rotation of the actuator arm assembly 12. The actuator arm assembly 12 is rotated about the shaft 14 by inserting the moving coil 26 into the magnetic circuit 16 and energizing the moving coil 26. The magnetic circuit 16 includes an outer stopper 32 and an inner stopper 34 for limiting the range of rotation of the actuator arm assembly 12.

Figure 4:
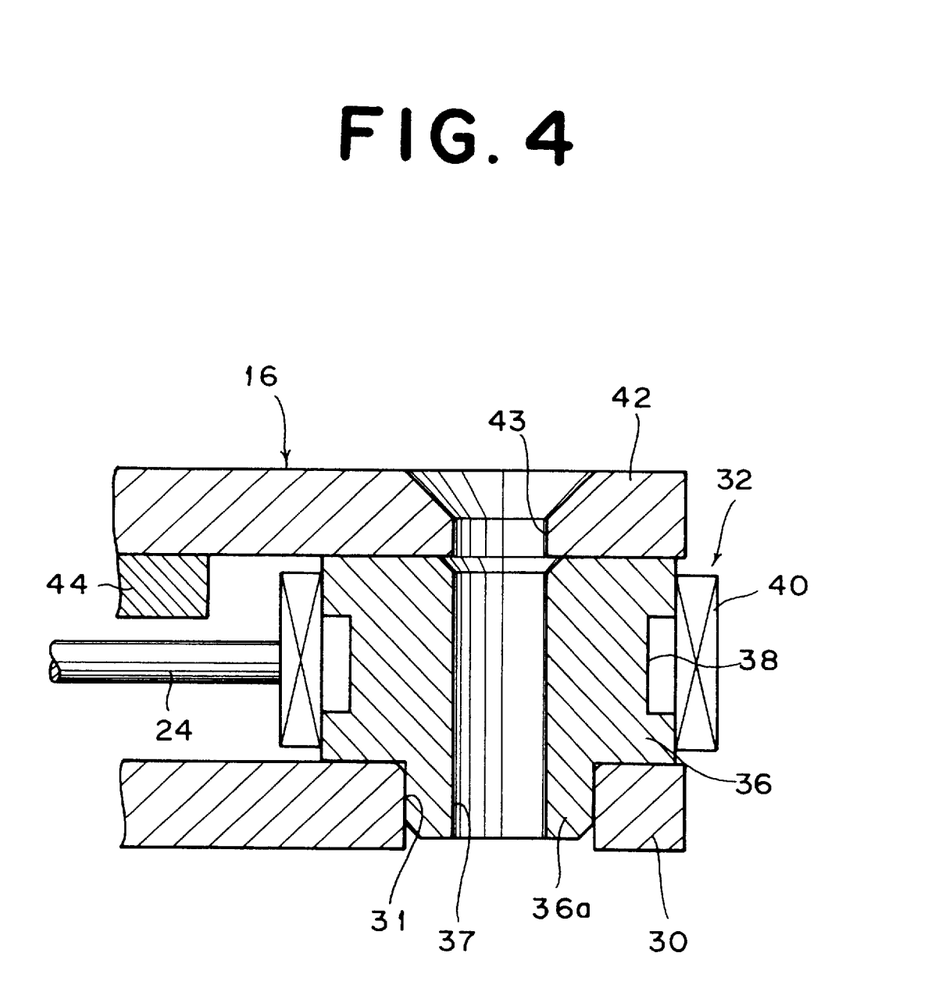
FIG. 4 is a sectional view of an outer stopper according to a first preferred embodiment of the present invention.

Referring to FIG. 4, there is shown a sectional view of the outer stopper 32 according to a first preferred embodiment of the present invention. Although not shown, the inner stopper 34 in this preferred embodiment is the same in structure as the outer stopper 32. Reference numeral 30 denotes a lower yoke. A small-diameter portion 36a of a shaft 36 of the outer stopper 32 is inserted in a hole 31 formed through the lower yoke 30. The shaft 36 has an axial through-hole 37. An annular groove 38 is formed on the outer circumferential surface of the shaft 36. A cylindrical rubber cushion 40 is mounted on the outer circumferential surface of the shaft 36 by press fitting so as to cover the annular groove 38.

The cylindrical rubber cushion 40 is positioned on the shaft 36 so as to be substantially in axial symmetry with respect to the axially central line of the annular groove 38. The reason for such axially symmetrical location of the cylindrical rubber cushion 40 is to make the flexure of the cylindrical rubber cushion 40 uniform in the axial direction. The rubber hardness of the rubber cushion 40 is set within the range of about 80° to about 90°, preferably, about 80° to about 87°. According to this preferred embodiment, the annular groove 38 is formed on the outer circumferential surface of the shaft 36, and the rubber cushion 40 is mounted on the shaft 36 so as to cover the annular groove 38 as mentioned above. Therefore, in spite of the fact that the rubber cushion 40 has a relatively high rubber hardness as set above, the outer stopper 32 can effectively reduce an impact acceleration in the seek direction of the actuator arm assembly 12.

That is, as compared with the case where a cylindrical rubber cushion having a rubber hardness of about 85° is mounted on a shaft having no annular groove as in the prior art, the cylindrical rubber cushion 40 can be easily flexed owing to the annular groove 38 formed on the shaft 36. The depth of the groove 38 must be larger than the amount of flexure of the rubber cushion 40 upon collision of the actuator arm assembly 12 against the outer stopper 32. If the depth of the groove 38 is insufficient, the rubber cushion 40 against which the actuator arm assembly 12 has collided may strike the bottom of the groove 38 to cause an increase in impact acceleration. Therefore, the depth of the annular groove 38 is suitably set to about 1 mm.

The thickness of the rubber cushion 40 must be so set as to allow the flexure of the rubber cushion 40 upon collision of the actuator arm assembly 12 in the case that it runs away. If the thickness of the rubber cushion 40 is excessive, the rubber cushion 40 may behave similarly to a rubber cushion mounted on a shaft having no annular groove, because of the high rubber hardness, causing an increase in impact acceleration. Therefore, the thickness of the rubber cushion 40 is suitably set within the range of about 1 mm to about 1.2 mm.

Reference numeral 42 denotes an upper yoke having a through-hole 43. A main magnet 44 is bonded to the lower surface of the upper yoke 42. The magnetic circuit 16 is fixed to the base 4 by inserting a screw through the through-holes 43 and 37 of the upper yoke 42 and the shaft 36 and threadedly engaging the screw with a tapped hole formed through the base 4. Although not shown, another screw is inserted through through-holes of the upper yoke 42 and a shaft of the inner stopper 34, and is threadedly engaged with another tapped hole formed through the base 4.

As shown by a broken line in FIGS. 1 and 3, the main magnet 44 is divided into a first magnet 44a and a second magnet 44b adjoining each other along a central portion 45 in respect of the seek direction, or the rotational direction of the actuator arm assembly 12. Both the first and second magnets 44a and 44b have upper and lower poles, and the polarities of the upper and lower poles of the first magnet 44a are opposite to the polarities of the upper and lower poles of the second magnet 44b, respectively.

Figure 5:
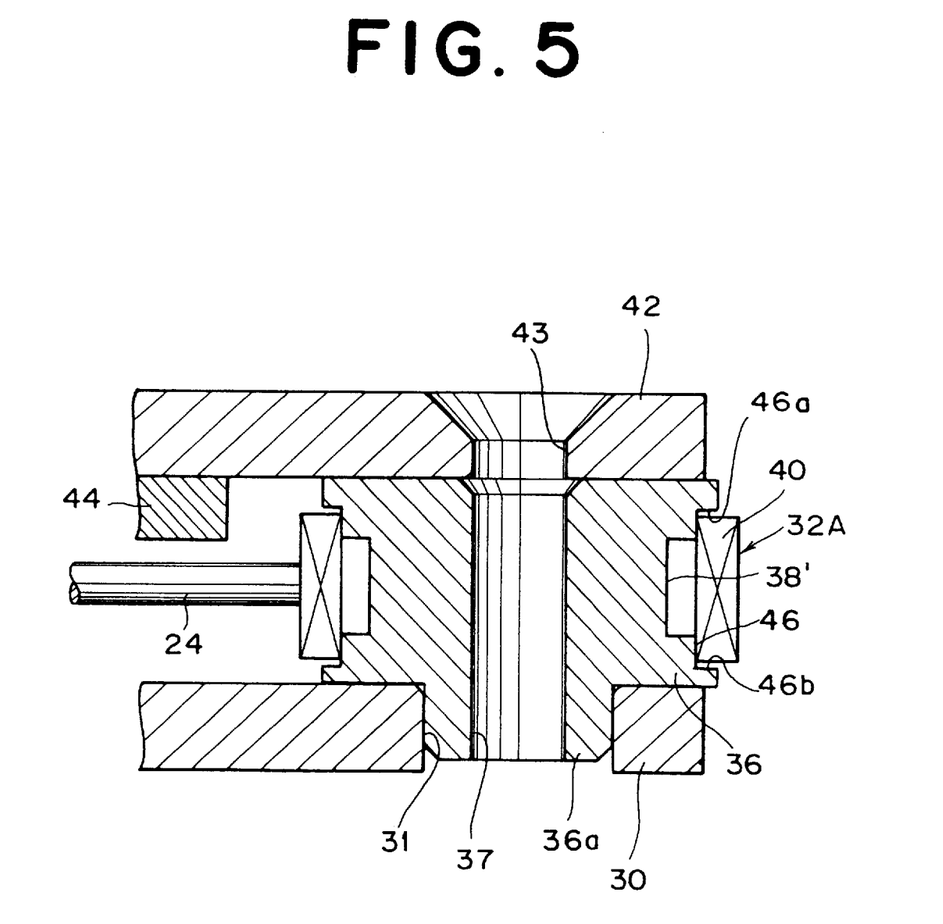
FIG. 5 is a sectional view of an outer stopper according to a second preferred embodiment of the present invention.

Referring to FIG. 5, there is shown a sectional view of an outer stopper 32A according to a second preferred embodiment of the present invention. Like the first preferred embodiment, an inner stopper in the second preferred embodiment is the same in structure as the outer stopper 32A. In the second preferred embodiment, substantially the same parts as those in the first preferred embodiment will be denoted by the same reference numerals, and the description thereof will be omitted to avoid repetition.

In the second preferred embodiment, an annular groove 46 is formed on the outer circumferential surface of a shaft 36 of the outer stopper 32A, and an annular groove 38' similar to the annular groove 38 in the first preferred embodiment is formed on the bottom of the annular groove 46. The width and the depth of the annular groove 38' are substantially similar to those of the annular groove 38 in the first preferred embodiment. A cylindrical rubber cushion 40 is received in the annular groove 46 and is mounted on the bottom of the annular groove 46 so as to cover the annular groove 38'. The annular groove 46 is formed substantially in axial symmetry with respect to the axially central line of the annular groove 38', and the annular groove 46 has an axial length slightly larger than that of the cylindrical rubber cushion 40. With this arrangement, vertical movement of the cylindrical rubber cushion 40 can be limited by an upper end (shoulder) 46a and a lower end (shoulder) 46b of the annular groove 46.

Figure 6:
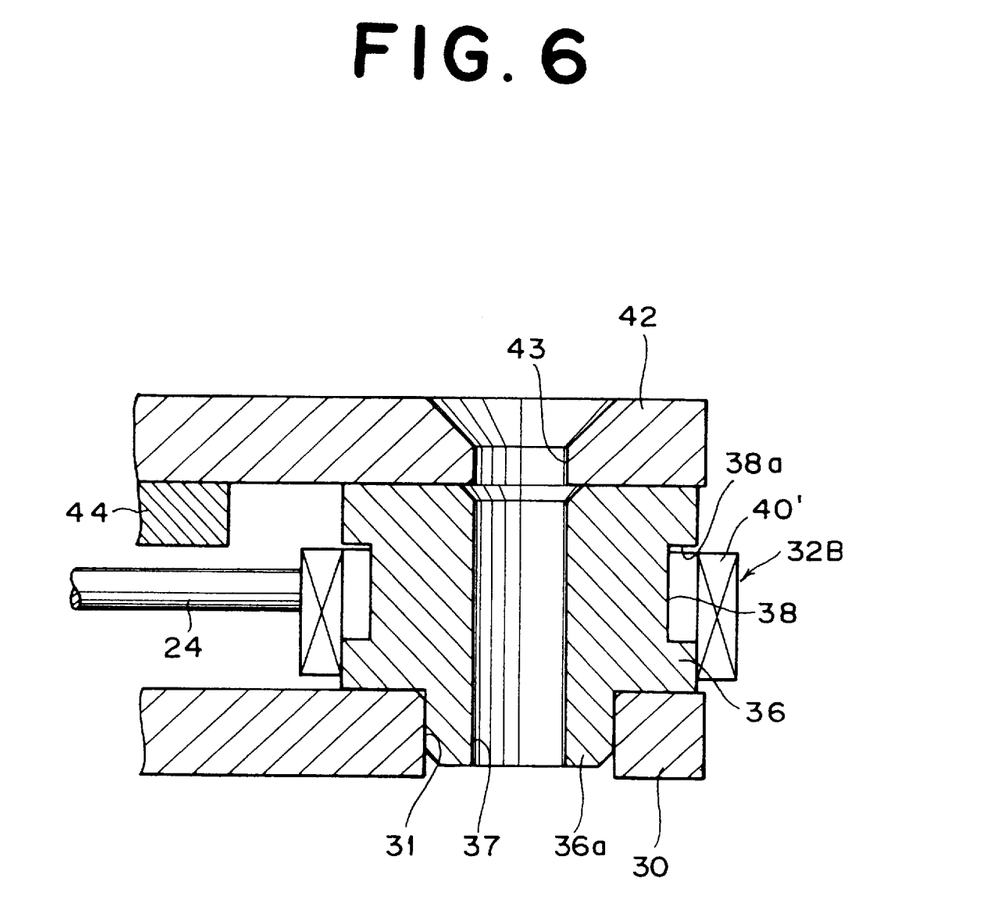
FIG. 6 is a sectional view of an outer stopper according to a third preferred embodiment of the present invention.

Referring to FIG. 6, there is shown a sectional view of an outer stopper 32B according to a third preferred embodiment of the present invention. Also in this preferred embodiment, an inner stopper is the same in structure as the outer stopper 32B. In the third preferred embodiment, substantially the same parts as those in the first preferred embodiment shown in FIG. 4 will be denoted by the same reference numerals, and the description thereof will be omitted to avoid repetition. In the third preferred embodiment, an annular groove 38 is formed on the outer circumferential surface of a shaft 36 of the outer stopper 32B, and a cylindrical rubber cushion 40' is mounted on the outer circumferential surface of the shaft 36 with an upper space defined between an upper end (shoulder) 38a of the annular groove 38 and an upper end of the cylindrical rubber cushion 40'.

This space allows easier flexure of the rubber cushion 40' as compared with the rubber cushion 40 in the first and second preferred embodiments. Accordingly, even when the rubber hardness of the rubber cushion 40' is high, the rubber cushion 40' can effectively absorb an impact acceleration. As a modification of this preferred embodiment, the cylindrical rubber cushion 40' may be mounted on the outer circumferential surface of the shaft 36 with a lower space defined between the lower end of the annular groove 38 and the lower end of the rubber cushion 40'.

Figure 7:
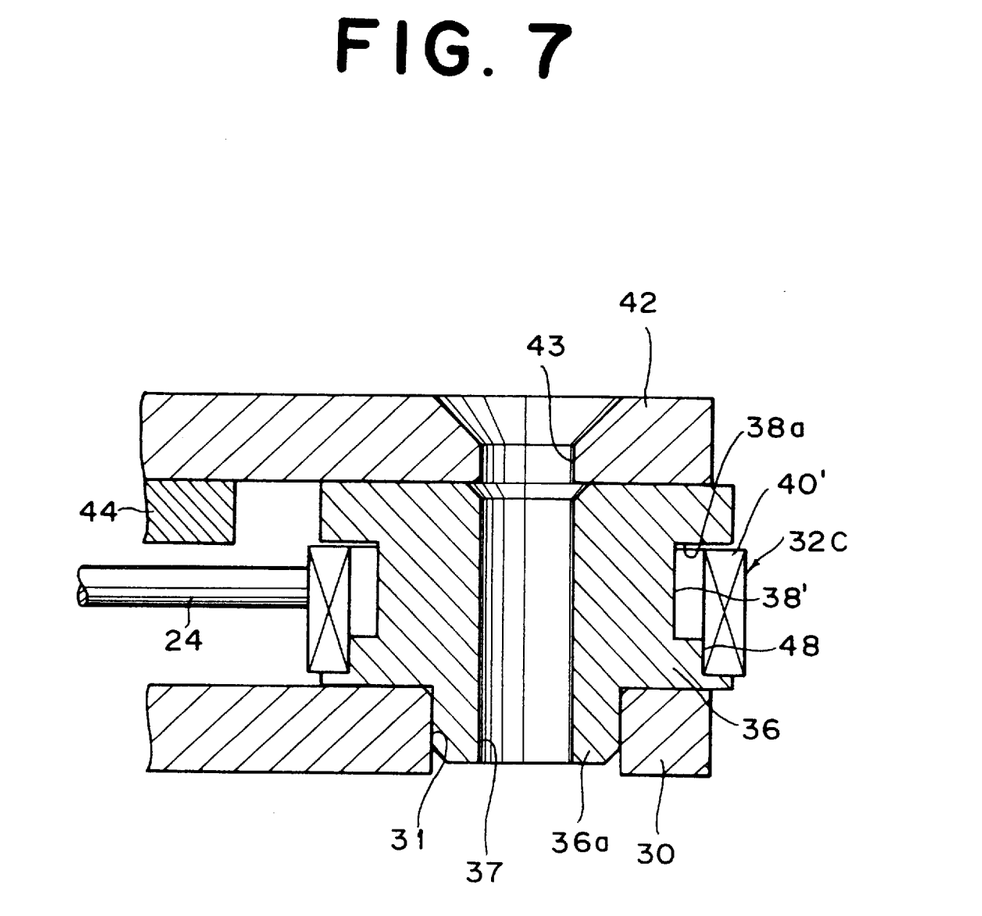
FIG. 7 is a sectional view of an outer stopper according to a fourth preferred embodiment of the present invention.

Referring to FIG. 7, there is shown a sectional view of an outer stopper 32C according to a fourth preferred embodiment of the present invention. Also in this preferred embodiment, an inner stopper is the same in structure as the outer stopper 32C. In this preferred embodiment, substantially the same parts as those in the first preferred embodiment shown in FIG. 4 will be denoted by the same reference numerals, and the description thereof will be omitted to avoid repetition. In the fourth preferred embodiment, an annular groove 48 is formed on the outer circumferential surface of a shaft 36 of the outer stopper 32C, and an annular groove 38' similar to the annular groove 38 in the third preferred embodiment shown in FIG. 6 is formed on the bottom of the annular groove 48. A cylindrical rubber cushion 40' is received in the annular groove 48 and is mounted on the bottom of the annular groove 48. Further, the upper end of the annular groove 48 is aligned with the upper end of the annular groove 38', and an upper space is defined between the upper end of the annular groove 38', or the upper end of the annular groove 48 and the upper end of the cylindrical rubber cushion 40'.

With this arrangement, it is possible to obtain effects similar to the effect in the second preferred embodiment and the effect in the third preferred embodiment. That is, vertical movement of the cylindrical rubber cushion 40' can be limited by the upper end and the lower end of the annular groove 48, and the cylindrical rubber cushion 40' can be more easily flexed owing to the upper space. As a modification of the fourth preferred embodiment, the cylindrical rubber cushion 40' may be mounted in the annular groove 48 so that a lower space is defined between the lower end of the annular groove 38' and the lower end of the rubber cushion 40'.

In the first to fourth preferred embodiments mentioned above, the cylindrical rubber cushion is used as a rubber cushion to be mounted on the shaft 36. The use of the cylindrical rubber cushion allows absorption of assembly tolerance of the actuator. For example, even if the assembly position of the actuator is deviated by the assembly tolerance from a nominal dimension, the start position of servo track writing can be maintained by the mounting of the cylindrical rubber cushion on the shaft. Further, since the rubber cushion having a high rubber hardness is used, the amount of static flexure can be reduced, which contributes to the effect of maintaining the start position of servo track writing, and also has an advantage in cost over a rubber cushion having a low rubber hardness.

As described above, according to the present invention, it is possible to provide an actuator stopper mechanism which can effectively suppress the impact acceleration of the actuator and also can reduce the cost. Furthermore, variations in the start position of servo track writing can be minimized.

What is claimed is:

1. A disk drive comprising:
   a housing having a base;
   a disk rotatably mounted in said housing and having a plurality of tracks;
   a head for reading/writing data on said disk;
   a head actuator rotatably mounted in said housing for moving said head across said tracks of said disk, said head actuator having an actuator arm for supporting said head at its tip end; and
   a stopper adapted to come into contact with said actuator arm, whereby said stopper restricts a range of rotational movement of said actuator arm, said stopper including a shaft fixed to said base and having an outer circumferential surface, a groove formed on said outer circumferential surface of said shaft, and a cushion member mounted on said outer circumferential surface of said shaft so as to at least partially cover said groove, wherein said groove is defined between a pair of shoulders, which form a portion of said outer circumferential surface and further wherein said cushion member is supported, at least in part, by at least one of said shoulders.

2. A disk drive according to claim 1, wherein said cushion member is positioned substantially in axial symmetry with respect to an axially central line of said groove.

3. A disk drive according to claim 1, wherein said cushion member is positioned so that an axial space is defined between an axial end of said groove and an axial end of said cushion member.

4. A disk drive according to claim 1, wherein said cushion member is comprised of an annular member fabricated from an elastomeric material of relatively high hardness.

5. A disk drive according to claim 1, wherein said cushion member is composed of an elastomeric material, whereby said cushion member is biased against at least one of said shoulders defining said groove.

6. A disk drive according to claim 1, wherein said cushion member is composed of a material different than that of said shaft.

7. A disk drive comprising:
   a housing having a base;
   a disk rotatably mounted in said housing and having a plurality of tracks;

a head for reading/writing data on said disk;

a head actuator rotatably mounted in said housing for moving said head across said tracks of said disk, said head actuator having an actuator arm for supporting said head at its tip end; and a stopper adapted to come into contact with said actuator arm, whereby said stopper restricts a range of rotational movement of said actuator arm, said stopper including a shaft fixed to said base and have an outer circumferential surface formed with a first groove, said first groove having a bottom surface formed with a second groove, and a cushion member mounted in said first groove so as to at least partially cover said second groove.

8. A disk drive according to claim 7, wherein said cushion member is positioned substantially in axial symmetry with respect to an axially central line of said second groove.

9. A disk drive according to claim 7, wherein said cushion member is positioned so that an axial space is defined between an axial end of said second groove and an axial end of said cushion member.

10. A disk drive according to claim 7, wherein said cushion member is comprised of an annular member fabricated from an elastomeric material of relatively high hardness.

11. A disk drive comprising:

a housing having a base;

a disk rotatably mounted in said housing and having a plurality of tracks;

a head for reading/writing data on said disk;

a head actuator rotatably mounted in said housing for moving said head across said tracks of said disk, said head actuator having an actuator arm for supporting said head at its tip end; and an inner stopper adapted to come into contact with said actuator arm, said inner stopper for stopping excess movement of said actuator arm toward an inner circumferential portion of said disk, said inner stopper including a first shaft fixed to said base and having an outer circumferential surface formed with a first annular groove, and a first cylindrical cushion member mounted on said outer circumferential surface of said first shaft so as to at least partially cover said first annular groove; and an outer stopper adapted to come into contact with said actuator arm, said outer stopper for stopping excess movement of said actuator arm toward an outer circumferential portion of said disk, said outer stopper including a second shaft fixed to said base and having an outer circumferential surface formed with a second annular groove, and a second cylindrical cushion member mounted on said outer circumferential surface of said second shaft so as to at least partially cover said second annular groove.

12. A disk drive according to claim 11, wherein said first cylindrical cushion member is positioned substantially in axial symmetry with respect to an axially central line of said first annular groove, and said second cylindrical cushion member is positioned substantially in axial symmetry with respect to an axially central line of said second annular groove.

13. A disk drive according to claim 11, wherein said first cylindrical cushion member is positioned so that a first upper space is defined between an upper end of said first annular groove and an upper end of said first cylindrical cushion member, and said second cylindrical cushion member is positioned so that a second upper space is defined between an upper end of said second annular groove and an upper end of said second cylindrical cushion member.

14. A disk drive according to claim 11, wherein said first cylindrical cushion member is positioned so that a first lower space is defined between a lower end of said first annular groove and a lower end of said first cylindrical cushion member, and said second cylindrical cushion member is positioned so that a second lower space is defined between a lower end of said second annular groove and a lower end of said second cylindrical cushion member.

15. A disk drive according to claim 11, wherein said first and second cylindrical cushion members are each comprised of an annular member fabricated from an elastomeric material of relatively high hardness.

16. A disk drive comprising:

a housing having a base;

a disk rotatably mounted in said housing and having a plurality of tracks;

a head for reading/writing data on said disk;

a head actuator rotatably mounted in said housing for moving said head across said tracks of said disk, said head actuator having an actuator arm for supporting said head at its tip end; and an inner stopper adapted to come into contact with said actuator arm, said inner stopper for stopping excess movement of said actuator arm toward an inner circumferential portion of said disk, said inner stopper including a first shaft fixed to said base and having an outer circumferential surface formed with a first annular groove, said first annular groove having a bottom surface formed with a second annular groove, and a first cylindrical cushion member mounted in said first annular groove so as to at least partially cover said second annular groove; and an outer stopper adapted to come into contact with said actuator arm, said outer stopper for stopping excess movement of said actuator arm toward an outer circumferential portion of said disk, said outer stopper including a second shaft fixed to said base and having an outer circumferential surface formed with a third annular groove, said third annular groove having a bottom surface formed with a fourth annular groove, and a second cylindrical cushion member mounted in said third annular groove so as to at least partially cover said fourth annular groove.

17. A disk drive according to claim 16, wherein said first annular groove is formed substantially in axial symmetry with respect to an axially central line of said second annular groove, and said first annular groove has an axial length slightly larger than that of said first cylindrical cushion member; and said third annular groove is formed substantially in axial symmetry with respect to an axially central line of said fourth annular groove, and said third annular groove has an axial length slightly larger than that of said second cylindrical cushion member.

18. A disk drive according to claim 16, wherein an upper end of said first annular groove is aligned with an upper end of said second annular groove, and said first cylindrical cushion member is positioned so that a first upper space is defined between the upper end of said first annular groove and an upper end of said first cylindrical cushion member; and an upper end of said third annular groove is aligned with an upper end of said fourth groove, and said second cylindrical cushion member is positioned so that a second upper space is defined between the upper end of said third annular groove and an upper end of said second cylindrical cushion member.

19. A disk drive according to claim 16, wherein a lower end of said first annular groove is aligned with a lower end of said second annular groove, and said first cylindrical cushion member is positioned so that a first lower space is defined between the lower end of said first annular groove and a lower end of said first cylindrical cushion member; and a lower end of said third annular groove is aligned with a lower end of said fourth groove, and said second cylindrical cushion member is positioned so that a second lower space is defined between the lower end of said third annular groove and a lower end of said second cylindrical cushion member.

20. A disk drive according to claim 16, wherein said first and second cylindrical cushion members are each comprised of an annular member fabricated from an elastomeric material of relatively high hardness.

21. A disk drive comprising:

a housing having a base;

a disk rotatably mounted in said housing and having a plurality of tracks;

a head for reading/writing data on said disk;

a head actuator rotatably mounted in said housing for moving said head across said tracks of said disk, said head actuator having an actuator arm for supporting said head at its tip end; and a stopper adapted to come into contact with said actuator arm, whereby said stopper restricts a range of rotational movement of said actuator arm, said stopper including a shaft fixed to said base and having an outer circumferential surface, a groove formed on said outer circumferential surface of said shaft, and a cushion member mounted on said outer circumferential surface of said shaft, wherein said groove is defined between a pair of shoulders, which form a portion of said outer circumferential surface and further wherein said cushion member is supported, at least in part, by said pair of shoulders such that said cushion member closes said groove.

* * * * *

UNITED STATES PATENT AND TRADEMARK OFFICE
CERTIFICATE OF CORRECTION

PATENT NO. : 5,864,447
DATED : May 2, 1996
INVENTOR(S) : Matsumoto et al.

Page 1 of 1

It is certified that error appears in the above-identified patent and that said Letters Patent is hereby corrected as shown below:

Column 1,
Line 19, between "number" and "reasons", insert -- of --
Line 46, delete "know" and insert -- known -- therefor Signed and Sealed this Twenty-fifth Day of January, 2005

JON W. DUDAS
*Director of the United States Patent and Trademark Office*